June 11, 1940.　　　J. D. DODGE　　　2,204,073
ROTOR CONSTRUCTION FOR ROTARY PUMPS
Filed Aug. 5, 1938
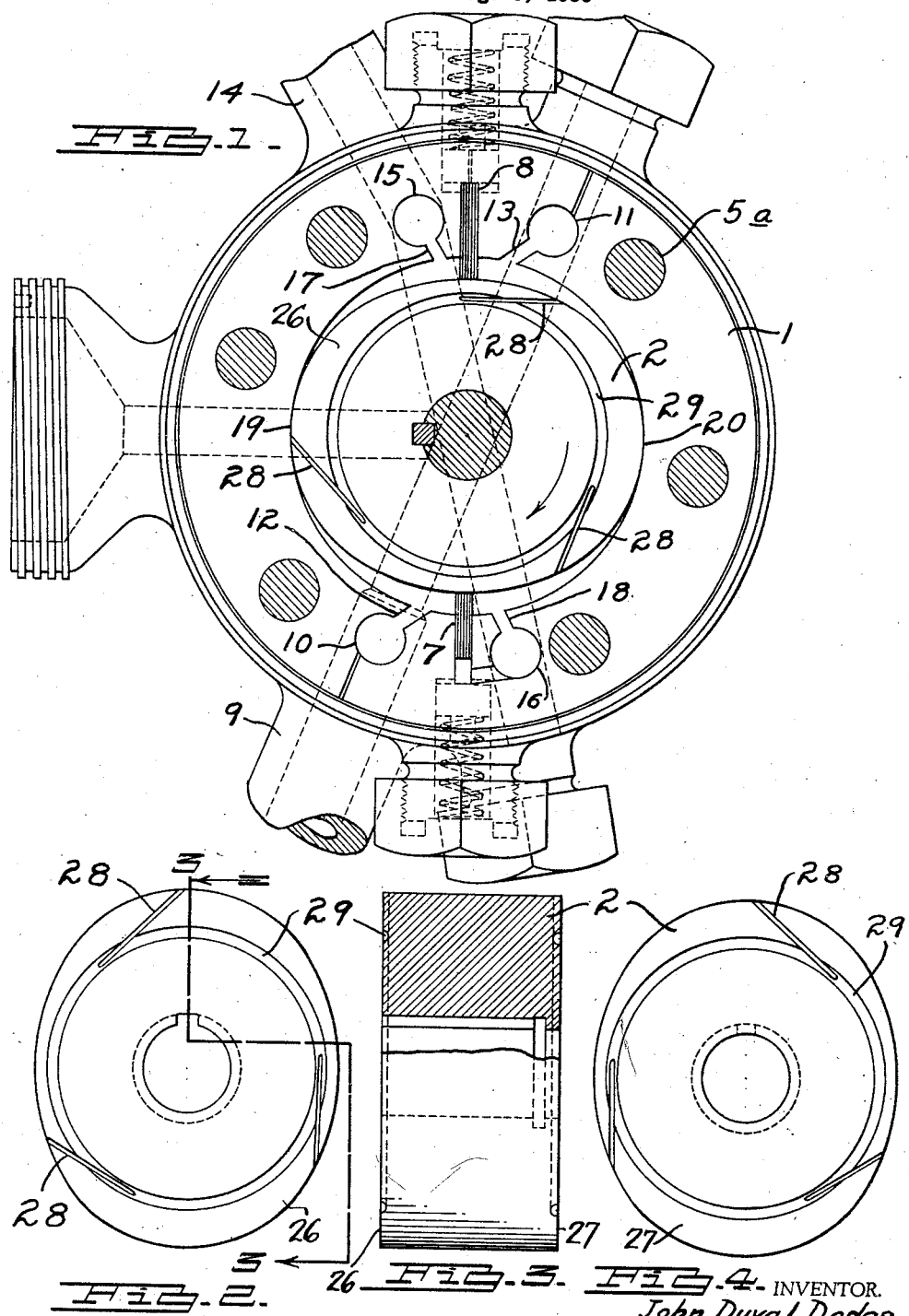
INVENTOR.
John Duval Dodge
BY
ATTORNEY.

Patented June 11, 1940

2,204,073

UNITED STATES PATENT OFFICE 2,204,073

ROTOR CONSTRUCTION FOR ROTARY PUMPS

John Duval Dodge, Detroit, Mich., assignor to Dodge Emulsor Corporation, Detroit, Mich., a corporation of Michigan Application August 5, 1938, Serial No. 223,187

3 Claims. (Cl. 103—123)

This invention relates to rotor construction for rotary pumps for the pumping of a liquid and discharging the same under a predetermined constant pressure.

A feature of the invention resides in the construction of the rotor whereby it may be fitted in a stator with practically as little clearance between the end walls and the respective walls of the stator as exists between the face of the rotor and peripheral face of the stator.

Heretofore, it has been necessary to form the stator with such clearance as will prevent heating by contact of the end walls of the rotor and respective stator walls and in so doing, considerable leakage is permitted from the pressure side to the intake side of the rotor between the end walls of the rotor and adjacent walls of the stator.

This invention seeks to provide a rotor structure in which the end walls of the rotor and adjacent walls of the stator are practically in contact, the said end walls of the rotor being so formed as to provide open faced channels into which a limited and inconsequential amount of liquid under pressure may be automatically injected to between the end faces of the rotor and contacting wall of the stator and through rotation of the rotor the liquid in the said channels is spread over the contacting surfaces of the stator and rotor.

A rotary pump provided with my improved rotor as herein disclosed is particularly well adapted for use in homogenizing lacteal liquids as well as other liquids which discharge from the pump through a homogenizer under particularly constant pressure resulting in a liquid that is practically uniform in respect to the degree of disintegration.

More specifically, the invention resides in the provision of grooves in the end faces of the rotor lying at an angle to a radial line of the rotor and opening to a circular groove at the inner end and through the face of the rotor at the periphery whereby rotation of the rotor and the forcing of the liquid under pressure to an outlet causes the liquid to pass into the grooves which are open to the face of the stator contacted by the end faces of the rotor and, in the case of a lacteal fluid, providing for lubrication.

A rotary pump constructed to provide for the discharge of a portion of the pumped liquid to between the end surfaces of the rotor and the stator and embodying other features of the invention is shown in the accompanying drawing in which—

Fig. 1 is an elevation of a pump with the end plate removed showing my improved rotor.

Fig. 2 is an end elevation of the rotor.

Fig. 3 is a face elevation of the rotor partly in section taken on line 3—3 of Fig. 4.

Fig. 4 is an elevation of the face of the rotor opposite that shown in Fig. 2.

The pump here shown comprises a stator 1 having a circular open ended recess or chamber for a rotor 2 which is of oval form and the rotor is keyed to a shaft 3. The opposite stator end plate (not here shown) is bolted by bolts 5a which extend through apertures therefor in the stator 1 positioned therebetween and hold the stator and end plates in assembled relationship. Blades 7 and 8 are slidably supported in the stator on diametrically opposite sides of the axis as shown in Fig. 1. The inlet conduit 9 is provided in the stator 1 and has two conduit like portions 10 and 11 which are shown in Fig. 1 as having passageways 12 and 13 respectively opening through the inner peripheral face of the stator. The outlet or pressure conduit is indicated at 14 which extends diametrically across the axis of the rotor and is formed in the header plate 5. The conduit 14 has passageways 15 and 16 on diametrically opposite sides of the rotor and said passageways are open through the stator face by the respective passageways 17 and 18. The blade 7 lies between the passageways 12 and 18 and the blade 8 lies between the passageways 13 and 17 and rotation of the rotor in the direction of the arrow shown causes liquid to be taken from the port or passageway 12 and as the rotor turns with the high point 19 contacting the stator face, fluid forward of the said point is forced through the passageways 17 and 15 to the outlet and in so passing draws liquid into the space between the rotor and stator from the passageway 12.

Likewise, the opposite high point 20 of the rotor in passing the port 13 draws liquid into the stator and forces liquid forward of the point 20 through the outlet port 18 to the outlet.

There are various other structural features of the pump not specifically described as not being of importance in respect to the invention herein disclosed which is in the structure of the rotor, particularly the end faces 26 and 27 of the rotor. These are shown in the drawing as provided with angularly disposed open faced channels or grooves 28, there being preferably three of such grooves which open at the outer end through the face of the rotor and at the inner end to a circular groove 29 also open through the face of the rotor and by rotation of the rotor, the fluid being pumped under pressure is forced through the grooves 28 and into the ring and thus maintains the two opposite end faces of the rotor with a film of the liquid being pumped.

The film prevents excessive wear and development of excessive heat through the metal contact and is useful in rotary pumps irrespective of the character of the liquid being transferred by the pump. In the case of a lacteal fluid being pumped, there is also a lubricating effect produced.

The angularly disposed grooves as shown at one end of the rotor in Fig. 1 are in the same relationship on the opposite end so that rotation of the rotor and liquid pressure developed thereby causes liquid to flow through the grooves provided on each of the opposite ends of the rotor.

The width and depth of the grooves may vary somewhat, depending upon the size of the rotor and I have found that, in a stator and rotor in which the diameter of the peripheral wall of the stator is three inches, the grooves may be one-sixteenth of an inch wide at the face of the rotor and approximately half that depth.

By the arrangement of the grooves through which fluid is forced under pressure by the pressure developed in the discharging of the liquid, fluid entering the channels under pressure from the pressure side would tend to seep through other passageways 28 into the intake side and thus there will be a slight flow of liquid sufficient to maintain the passageways clear.

As previously stated, the pump structure is not material, that is, whether it is to be used for the homogenization of various liquids or for other purposes such as merely transferring a liquid under pressure but in any case where liquid is to be transferred from an intake and discharged under pressure to an outlet by means of a rotor, the formation of the end faces of the rotor with the groove are of such character as to fill with the liquid under pressure and to thus maintain a film of liquid between the end faces of the rotor and the end walls of the stator. The amount of liquid that may by-pass from the high to the low pressure side of the rotor through the grooves is so minute as to be of no particular detriment. In fact such minute seepage is desirable in that it constantly maintains a clean film of liquid between the contacting surfaces of the end walls of the rotor and respective walls of the stator or casing.

It is believed evident from the foregoing description, that the various objects and features of the invention are secured by the structure described, more particularly the construction of the end faces of the rotor, and it is pointed out that various changes may be made in the arrangement of the parts productive of the described result and also various changes made in the form of the stator and arrangement of the channels therein without departing from the spirit and scope of the invention as set forth in the appended claims.

Having thus fully described my invention, its utility and mode of operation, what I claim and desire to secure by Letters Patent of the United States is—

1. In a rotary pump, a stator member and a rotor member, the stator having a cylindrical recess forming a chamber of circular form having flat side walls, the rotor being positioned in the recess of the stator and having an oval periphery the long diameter of which is substantially equal to the diameter of the recess and contacting the same at diametrically opposite points, an inlet conduit having two openings to the chamber one on each of the diametrically opposite sides thereof and an outlet conduit likewise having two openings to the said chamber one on each of the diametrically opposite sides thereof, the inlet and outlet openings on each of the opposite sides of the recess being in spaced relation, a spring pressed blade on each of the diametrically opposite sides of the recess between the respective inlet and outlet openings and riding in contact with the rotor periphery, the opposite side walls of the rotor being substantially in contact with the side walls of the stator, the two walls of one of the members having a groove each provided with openings leading to the periphery of the rotor and permitting liquid under pressure to pass from the chamber between the periphery of the rotor and the periphery of the chamber into the grooves and to be spread over the contacting surfaces of the rotor and stator walls by rotation of the rotor.

2. In a rotary pump, a stator and a rotor, the stator having a cylindrical recess forming a chamber of circular form having flat side walls, the rotor being positioned in the recess of the stator and having an oval periphery the long diameter of which is substantially equal to the diameter of the recess and contacting the same at diametrically opposite points, an inlet conduit having two openings to the chamber one on each of the diametrically opposite sides thereof and an outlet conduit likewise having two openings to the said chamber one on each of the diametrically opposite sides thereof, the inlet and outlet openings on each of the opposite sides of the recess being in spaced relation, a spring pressed blade on each of the diametrically opposite sides of the recess between the respective inlet and outlet openings and riding in contact with the rotor periphery, the opposite side walls of the rotor being substantially in contact with the side walls of the stator, the side walls of the rotor each having a groove opening to the periphery of the rotor permitting liquid under pressure to pass from the chamber between the periphery of the rotor and the peripheral wall of the chamber into the grooves to spread over the contacting surfaces of the rotor and stator walls by rotation of the rotor.

3. In a rotary pump, a stator and a rotor, the stator having a cylindrical recess forming a chamber of circular form having flat side walls, the rotor being positioned in the recess of the stator and having an oval periphery the long diameter of which is substantially equal to the diameter of the recess and contacting the same at diametrically opposite points, an inlet conduit having two openings to the chamber one on each of the diametrically opposite sides thereof and an outlet conduit likewise having two openings to the said chamber one on each of the diametrically opposite sides thereof, the inlet and outlet openings on each of the opposite sides of the recess being in spaced relation, a spring pressed blade on each of the diametrically opposite sides of the recess between the respective inlet and outlet openings and riding in contact with the rotor periphery, the opposite side walls of the rotor being substantially in contact with the side walls of the stator, the two opposite side walls of the rotor having a ring groove and a number of grooves opening thereto at one end and extending at an acute angle in the direction of rotation of the rotor and opening to the chamber between the rotor and stator whereby the liquid under pressure is caused to enter a groove and spread the liquid over the contacting surfaces of the rotor and stator by rotation of the rotor.

JOHN DUVAL DODGE.